US012693878B2

(12) United States Patent
Fontenot et al.

(10) Patent No.: US 12,693,878 B2
(45) Date of Patent: Jul. 28, 2026

(54) APPLICATION ONBOARDING WITHIN WORKLOAD PROTECTION SOLUTIONS

(71) Applicant: Cisco Technology, Inc., San Jose, CA (US)

(72) Inventors: Gabriel J. Fontenot, Richardson, TX (US); Paul Mach, San Jose, CA (US); Tony Lee, San Jose, CA (US); Brijeshkumar Ravindrakumar Shah, Cary, NC (US); Janardhanan Radhakrishnan, San Jose, CA (US); Aamir Ahmed, San Jose, CA (US); Amandeep Singh, Apex, NC (US); Apurva Chhajed, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 197 days.

(21) Appl. No.: 18/523,761

(22) Filed: Nov. 29, 2023

(65) Prior Publication Data

US 2025/0173168 A1     May 29, 2025

(51) Int. Cl.
    *G06F 9/451*       (2018.01)
    *G06F 3/0482*     (2013.01)
    *G06F 9/445*       (2018.01)

(52) U.S. Cl.
    CPC ............ *G06F 9/451* (2018.02); *G06F 3/0482* (2013.01); *G06F 9/445* (2013.01)

(58) Field of Classification Search
    CPC ........ G06F 9/451; G06F 3/0482; G06F 9/445; G06F 3/0484; G06F 3/04847; G06F 3/04895; H04L 63/20; H04L 67/1036; H04L 67/34
    See application file for complete search history.

(56) References Cited

U.S. PATENT DOCUMENTS

| | | | |
|---|---|---|---|
| 11,163,586 B1 * | 11/2021 | Mathur | ................ G06F 9/3836 |
| 2020/0249956 A1 | 8/2020 | Raja Jayaraman et al. | |
| 2021/0075693 A1 | 3/2021 | Su et al. | |
| 2022/0210194 A1 * | 6/2022 | Parekh | .................... H04L 67/10 |
| 2022/0217211 A1 | 7/2022 | Scarfutti et al. | |
| 2022/0327587 A1 | 10/2022 | Majusiak et al. | |
| 2022/0394038 A1 | 12/2022 | O'Connor et al. | |

\* cited by examiner

*Primary Examiner* — Asher D Kells
(74) *Attorney, Agent, or Firm* — Rutan & Tucker, LLP; Ravi Mohan; Marc McClain

(57) ABSTRACT

Devices, systems, methods, and processes for facilitating new application onboarding within a workload protection solution is described herein. As new applications are introduced into a system, users or network administrators may not be knowledgeable on how to properly onboard the application sufficient to effect proper segmentation, monitoring, and the like. Without proper onboarding, the system may not be optimized and can become less optimal over time as new applications are added. By automating at least a portion of that process, a more optimal system can be achieved. This automation may be achieved through a series of prompts to the user to input various characteristics about the application that can be utilized to generate a recommended policy to apply to the application in order to onboard it into the system. The policy can be reviewed, confirmed, and applied through a graphical user interface or the like.

19 Claims, 9 Drawing Sheets

600

RECEIVE A REQUEST TO ONBOARD A NEW APPLICATION — 610

GENERATE A PLURALITY OF PROMPTS FOR USER INPUT — 620

RECEIVE USER INPUT DATA — 630

PROVIDES A SELECTION OF WORKLOADS FOR USER SELECTION — 640

RECEIVE WORKLOAD SELECTION — 650

GENERATE APPLICATION CONFIGURATION — 660

APPLY THE APPLICATION CONFIGURATION — 670

Figure 7:
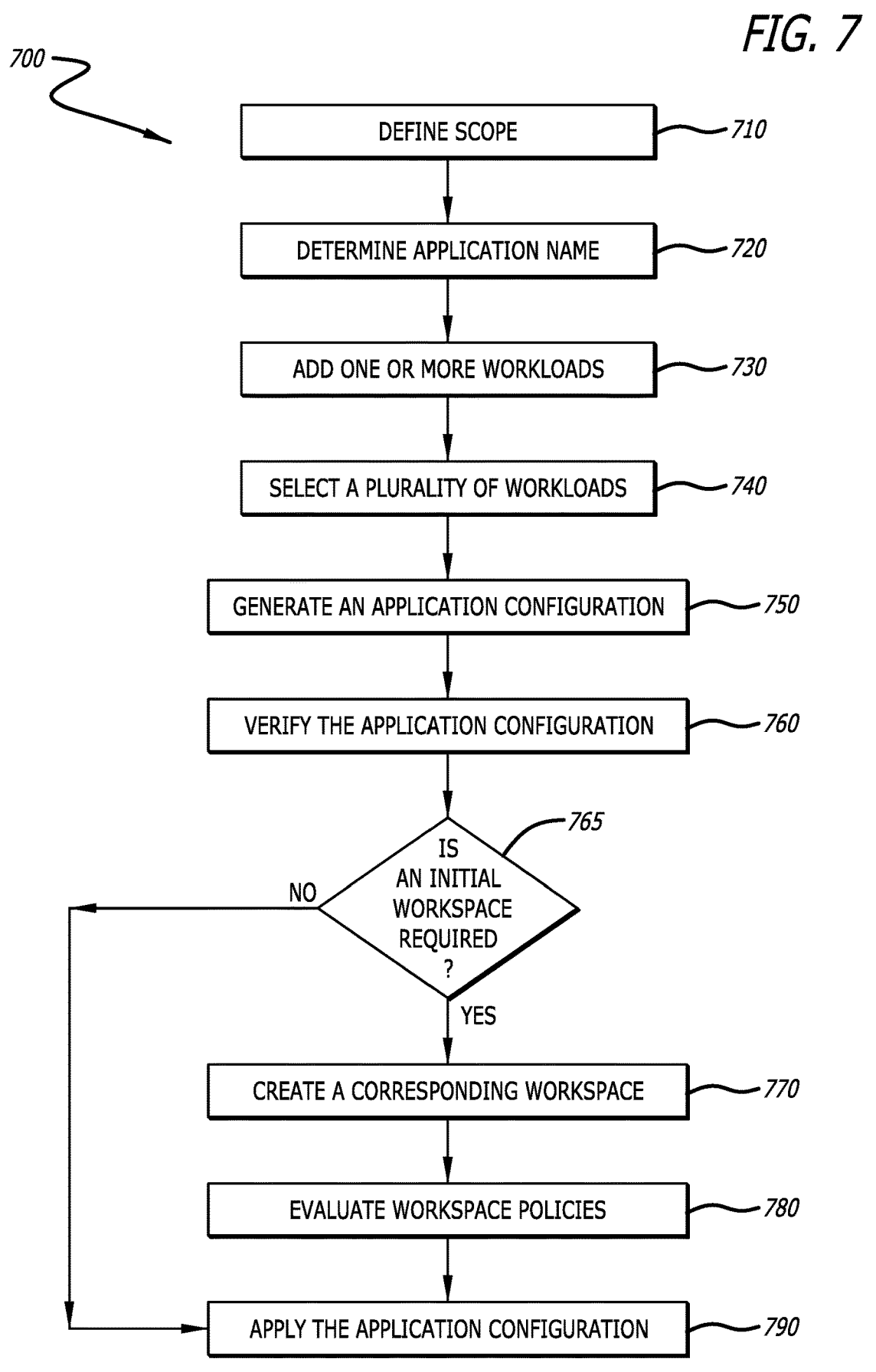

DEFINE SCOPE ⟞ 710

↓

DETERMINE APPLICATION NAME ⟞ 720

↓

ADD ONE OR MORE WORKLOADS ⟞ 730

↓

SELECT A PLURALITY OF WORKLOADS ⟞ 740

↓

GENERATE AN APPLICATION CONFIGURATION ⟞ 750

↓

VERIFY THE APPLICATION CONFIGURATION ⟞ 760

↓

IS AN INITIAL WORKSPACE REQUIRED ? ⟞ 765

NO →

YES ↓

CREATE A CORRESPONDING WORKSPACE ⟞ 770

↓

EVALUATE WORKSPACE POLICIES ⟞ 780

↓

APPLY THE APPLICATION CONFIGURATION ⟞ 790

800

SELECT AN APPLICATION TO ONBOARD — 810

DEFINE SCOPES AND LABELS ASSOCIATED WITH THE APPLICATION — 820

SELECT AN APPLICATION NAME — 830

ADD SUBNETS AND INTERNET PROTOCOL ADDRESSES ASSOCIATED WITH THE APPLICATION — 840

SELECT ONE OR MORE WORKLOADS ASSOCIATED WITH THE SCOPE — 850

REVIEW A GENERATED POLICY — 860

CONFIRM THE GENERATED POLICY — 870

APPLICATION ONBOARDING WITHIN WORKLOAD PROTECTION SOLUTIONS

The present disclosure relates to networking. More particularly, the present disclosure relates to easing the application onboarding process within a workload protection solution.

BACKGROUND

Software applications have become critically important for organizations worldwide, serving as the lifeblood of their operations. Applications not only drive revenue but also engage customers, facilitate business outcomes, and differentiate organizations from their competitors. Developers, as the creators of these applications, play a central role in business transformation and are valued customers of enterprise IT. IT operators, including networking professionals, provide business value by supporting applications with agility and efficiency.

Developers are deploying applications in multiple public and private clouds, often alongside legacy applications in various data centers. The rise of microservices is also contributing to the development of highly distributed application environments, with application tiers and data services spread across data centers and public clouds. However, outdated protocols and tools have failed to keep up with these dynamic application environments, leading to challenges in monitoring and ensuring application availability and performance.

Addressing these challenges can lead to better network performance and reliability. In response, workload protection solutions offer machine learning capabilities that provide actionable insights into network performance. They can enhance network visibility, supports mission-critical applications in both on-premises data centers and the public cloud, and offers comprehensive traffic telemetry information. The platform performs advanced analytics and tracks network topology, making it easier for operations teams to manage and optimize network performance for digital business and cloud infrastructures. Such a holistic approach to protect data centers and workloads across multiple cloud environments can be achieved, in part, by implementing segmentation, zero-trust models, and automated compliance enforcement.

However, many users of workload protection solutions do not have a consistent approach to manage the process of application onboarding. As these users continue with application segmentation, a repeatable workflow to suggest application onboarding is desired to create a more functional and standard implementation process. This inconsistency in application onboarding creates multiple opportunities for future design updates/modifications and introduces operational challenges.

SUMMARY OF THE DISCLOSURE

Systems and methods for easing the application onboarding process within a workload protection solution in accordance with embodiments of the disclosure are described herein. In some embodiments, a device includes a processor, at least one network interface controller configured to provide access to a network, and a memory communicatively coupled to the processor, wherein the memory includes a workload protection logic. The logic is configured to receive an application onboarding request, generate a plurality of prompts configured for user input, receive user input data, and generate application configuration.

In some embodiments, the application onboarding request is associated with a specific application.

In some embodiments, the plurality of prompts are generated based on at least the specific application.

In some embodiments, the plurality of prompts are displayed on a graphical user interface.

In some embodiments, the graphical user interface is associated with a workload protection solution.

In some embodiments, the workload protection logic is further configured to determine one or more workloads associated with the user input data, and provide a selection of workloads configured for user selection.

In some embodiments, the selection of workloads is provided on a graphical user interface.

In some embodiments, the workload protection logic is further configured to receive a workload selection.

In some embodiments, the workload protection logic is further configured to generate an application configuration based at least on the user input data and workload selection data.

In some embodiments, the workload protection logic is further configured to apply the application configuration to the network.

In some embodiments, the user input data includes at least a valid application name.

In some embodiments, the user input data includes at least a defined scope.

In some embodiments, a selection of workloads provided is associated with the defined scope.

In some embodiments, the workload protection logic is further configured to provide one or more prompts configured for subnet boundary input.

In some embodiments, the workload protection logic is further configured to provide one or more prompts configured for internet protocol address input.

In some embodiments, the workload protection logic is further configured to determine if an initial workspace will be required.

In some embodiments, the initial workspace is utilized for policy evaluation.

In some embodiments, a device includes a processor, at least one network interface controller configured to provide access to a network, and a memory communicatively coupled to the processor, wherein the memory includes a workload protection logic. The logic is configured to select at least one application to onboard, generate application data via defining at least one scope and label associated with the at least one application, determining an application name, and associating a plurality of workloads with the at least one application, and generate an application policy based at least on the application data.

In some embodiments, the application data is received from one or more prompts displayed on a graphical user interface.

In some embodiments, a method of onboarding an application includes receiving a plurality of application data including at least at least one scope and label associated with at least one application, an application name, and a plurality of workloads determined to be associated with the application, generating an application policy based at least on the application data, and applying the generated application policy within a workload protection solution.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 7 is a flowchart depicting a more-detailed process for application onboarding in workload protection solutions in accordance with various embodiments of the disclosure;

Figure 1:
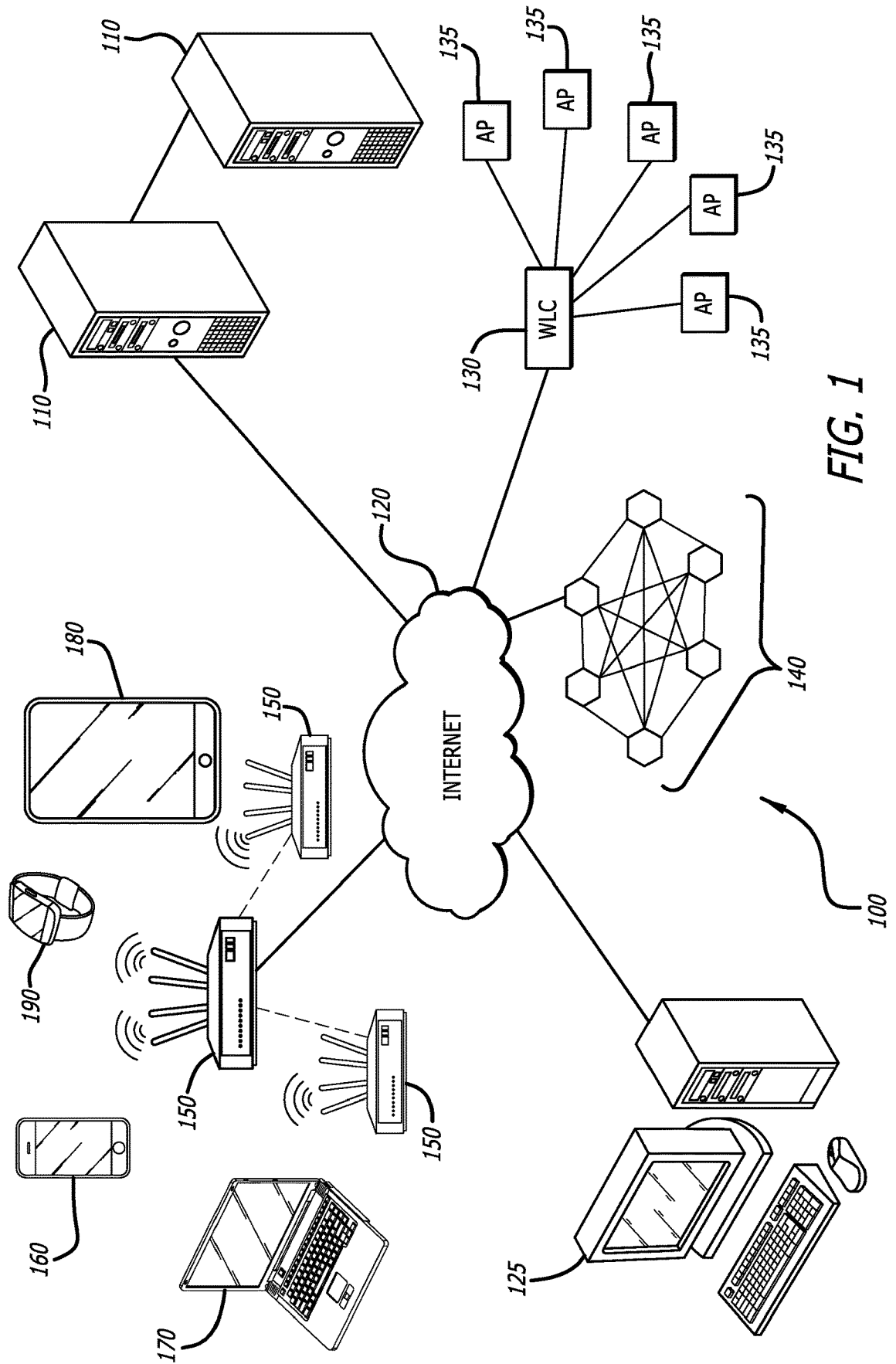
FIG. 1 is a conceptual network diagram of various environments that a workload protection logic may operate within in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that can facilitate application onboarding in workload protection solutions. This can be done by prompting a user for various data points, or, in certain embodiments, automating some of the process with a heuristic rule set or one or more machine learning processes. In many embodiments, the user may be prompted to account for various configuration entry points across various endpoints within the workload protection solution.

The suggested workflow derived from these prompts can allow users to focus on the application need and can provide a recommended entry point for attaching an application to a given scope tree (or application boundary). Embodiments described herein can remove multiple steps within the process of application onboarding by introducing a consolidated experience through defining the scope and associated labels within the same process.

In many embodiments, a workload protection logic can be configured to receive an application onboarding request, generate a plurality of prompts for the user to input, receive user input data, and generate an application configuration (i.e., a recommended policy). These prompts can be delivered on a graphical user interface. As those skilled in the art will recognize, the delivery and/or presentation of the graphical user interface can vary drastically depending on the device presenting the interface. However, the prompts may be adjusted depending on the host device, or system. The user may input data related to the application, application name, associated labels, scopes, workloads, subnets, internet protocol (IP) addresses, and the like. In some embodiments, a unique workspace may be required for the new application. The generated application configuration can subsequently be applied to the application and/or the workload protection solution, etc.

Workload Protection Solutions

In many embodiments, a workload protection solution offers a holistic approach to protect data centers across multiple cloud environments by implementing a zero-trust model through segmentation. This approach helps in faster detection of security incidents, containment of lateral movement, and reduction of the attack surface. Workload protection solutions are often infrastructure-agnostic and support on-premises as well as public cloud workloads. These solutions can provide capabilities like automated "allow list" policy generation based on real-time telemetry data, enforcing a zero-trust model, identifying process behavior deviations, and detecting software vulnerabilities. These workload protection solutions can be deployed in numerous way including, but not limited to, appliance-based, virtual, and Software as a Service ("SaaS") deployment solutions.

Workloads

In the context of various network infrastructures, a "workload" typically refers to a unit of work or a specific set of tasks that a computing system, server, or other network device is responsible for executing. In some environments, the term "workload" may be hosts that have a Secure Workload Agent ("SWA") installed while hosts that do not have a SWA installed on them can be considered "IP addresses".

Workloads can vary widely and encompass various types of applications and services, including application workloads like web applications and databases, virtualization workloads represented by virtual machines or containers in virtualized environments, data workloads related to data processing and storage tasks, network workloads associated with network services and data transmission, security workloads for services like firewalls and encryption, and storage workloads concerning data storage and management. Workload protection solutions can secure these various workloads in data centers, cloud environments, and network infrastructures. Understanding and efficiently securing various workloads is often considered essential for optimizing resource utilization and ensuring the performance, and reliability of IT systems.

Segmentation

In networking, "segmentation" often refers to the strategic practice of dividing a network into smaller, isolated segments or subnetworks. Workload protection solutions can utilize segmentation to achieve several critical objectives. Firstly, it bolsters network security by isolating different segments from one another, safeguarding against the potential fallout of a security breach in one segment from affecting the entire network. These segmentation solutions can enforce security policies and regulate traffic flow between segments to prevent unauthorized access and data breaches.

Secondly, segmentation can often simplify network management. By breaking down a large network into more manageable parts, administrators can apply specific policies, monitor network traffic, and troubleshoot issues more effectively within each isolated segment. Additionally, network performance can benefit from segmentation as it reduces congestion and contention for network resources, ultimately enhancing the performance of critical applications and services. Workload protection solutions can be configured to implement network segmentation and micro-segmentation. These tools empower organizations to create, manage, and maintain network segments efficiently, contributing to a more secure, manageable, and streamlined network infrastructure.

Zero-Trust

Also, in the realm of networking, "zero-trust" typically represents a security paradigm that fundamentally challenges the traditional notion of trust within network environments. This model can operate on the premise that no entity, whether situated inside or outside the network, should be automatically trusted. Instead, it mandates stringent access controls and continuous validation procedures. Entities, including users, devices, and applications, are required to authenticate their identity and demonstrate their security posture before being granted access to network resources. This approach aims to fortify network security by eliminating assumptions of trust and significantly reducing the risk of unauthorized access or breaches.

Zero trust principles encompass several key tenets. Firstly, identity verification is a prerequisite for access, necessitating robust authentication methods like multi-factor authentication ("MFA"). Secondly, access rights are strictly governed by the principle of least privilege, limiting permissions to the bare minimum essential for entities to perform their designated functions. Micro-segmentation can be employed to isolate and secure network segments, ensuring rigorous controls on traffic flow and minimizing the potential attack surface. Continuous monitoring of network traffic and entity behavior is paramount to promptly detect and respond to anomalies or security threats.

Lastly, encryption is often widely adopted to safeguard data, whether in transit or at rest. This comprehensive zero trust model can address the evolving threat landscape, acknowledging the presence of potential threats both within and outside the network. It is designed to enhance data and resource security, regardless of their location, in recognition that traditional perimeter-based security approaches are no longer adequate in today's complex and dynamic network environments. Workload protection solutions can be configured to provide solutions to implement a zero-trust security model effectively.

Scopes

Scopes serve as a fundamental component in configuring and establishing policies within a workload protection solution. Scopes can be considered as collections of workloads organized in a hierarchical structure. Workloads can be labeled with attributes that provide insights into their location, role, and/or function in the environment. Often, the purpose of scopes is to offer a framework for dynamic mechanisms, particularly in terms of identification and attributes associated with changing IP addresses.

Scopes may also be primarily utilized for grouping data-center applications and, when combined with roles, they enable precise control over the management of these applications. For instance, scopes play a pivotal role in defining access to policies, flows, and filters throughout the product. These scopes can be structured hierarchically, forming sets of trees with the root representing, for example, a Virtual Routing and Forwarding (VRF). Each scope tree hierarchy can represent distinct data that does not overlap with others. When defining individual scopes, key attributes can include the parent scope, name (for identification), type (for specifying different categories of inventory), and a query (that can define the individual scope). Often, it may be desired to organize one or more scopes hierarchically to mirror the application ownership hierarchy within the organization.

These scopes are often instrumental in constructing a hierarchical map of your network, which can be referred to as a "scope tree." This hierarchical representation is essential for efficiently establishing and maintaining network policies. For example, utilizing a scope tree can enable the creation of a policy that can be automatically applied to every workload within a specific branch of that tree. Additionally, a scope tree can facilitate the delegation of responsibility for managing certain applications or network segments to individuals with the necessary expertise to define the appropriate policies for those workloads.

Labels

Labels can play a crucial role in defining logical policies within a managed network. By way of non-limiting example, labels can be configured to enable the creation of policies like "allow traffic from "consumer network applications" to "provider database"." Rather than specifying the exact members of the consumer and provider workload groups, these logical policies can be formulated using labels, providing flexibility in dynamically modifying the membership of these groups without altering the policy. Workload protection solutions can receive notifications from configured services, such as external orchestrators and cloud connectors, when workloads are added or removed. This may allow the workload protection solution to continually assess the composition of groups like "consumer network applications" and "provider database" to ensure accurate policy enforcement. Additionally, subnet-based label inheritance is supported, which can allow smaller subnets and IP addresses to inherit labels from larger subnets they belong to. This inheritance can occur when labels are either missing from the smaller subnet/address or when the label value for the smaller subnet/address is empty, enhancing the efficiency and consistency of label management.

Agents

As those skilled in the art will recognize, a software agent or "agent" typically refers to a specialized and autonomous program or script that is designed to perform tasks or make decisions on behalf of a user, system, or organization. These agents can range from simple to highly complex and are often used to automate tasks, gather, and analyze data, and/or interact with other software systems and users. They can act on predefined rules and logic or adapt and learn from their environment. Software agents are used in various applications, including network management, artificial intelligence, data mining, and automation of routine tasks. They can be configured to allow software components to act independently or collaboratively to achieve specific goals.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual network diagram of various environments that a workload protection logic may operate within in accordance with various embodiments of the disclosure is shown. Those skilled in the art will recognize that a workload protection logic can be comprised of various hardware and/or software deployments and can be configured in a variety of ways. In some non-limiting examples, the workload protection logic can be configured as a standalone device, exist as a logic within another network device, be distributed among various network devices operating in tandem, or remotely operated as part of a cloud-based network management tool.

In many embodiments, the network 100 may comprise a plurality of devices that are configured to transmit and receive data for a plurality of clients. In various embodiments, cloud-based centralized management servers 90 are connected to a wide-area network such as, for example, the Internet 90. In further embodiments, cloud-based centralized management servers 90 can be configured with or otherwise operate a workload protection logic. The workload protection logic can be provided as a cloud-based service that can service remote networks, such as, but not limited to the deployed network 140. In these embodiments, the workload protection logic can be a logic that receives data from the deployed network 140 and generates predictions, receives environmental sensor signal data, and perhaps automates certain decisions or protective actions associated with the network devices. In certain embodiments, the workload protection logic can generate historical and/or algorithmic data in various embodiments and transmit that back to one or more network devices within the deployed network 140.

However, in additional embodiments, the workload protection logic may be operated as distributed logic across multiple network devices. In the embodiment depicted in FIG. 1, a plurality of network access points (APs) 150 can operate as a workload protection logic in a distributed manner or may have one specific device facilitate the detection of movement for the various APs. This can be done to provide sufficient needs to the network of APs such that, for example, a minimum bandwidth capacity may be available to various devices. These devices may include but are not limited to mobile computing devices including laptop computers 170, cellular phones 160, portable tablet computers 180 and wearable computing devices 190.

In still further embodiments, the workload protection logic may be integrated within another network device. In the embodiment depicted in FIG. 1, the wireless LAN controller 130 may have an integrated workload protection logic that it can use to generate predictions, and perhaps detect anomalous movements regarding the various APs 135 that it is connected to, either wired or wirelessly. In this way, the APs 135 can be configured such that they can read and report various signal levels and environmental sensor signals to the WLC 130. In still more embodiments, a personal computer 95 may be utilized to access and/or manage various aspects of the workload protection logic, either remotely or within the network itself. In the embodiment depicted in FIG. 1, the personal computer 95 communicates over the Internet 90 and can access the workload protection logic within the cloud based centralized management servers 90, the network APs 150, or the WLC 130 to modify or otherwise monitor the workload protection logic.

Although a specific embodiment for a conceptual network diagram of a various environments that a workload protection logic operating on a plurality of network devices suitable for carrying out the various steps, processes, methods, and operations described herein is discussed with respect to FIG. 1, any of a variety of systems and/or processes may be utilized in accordance with embodiments of the disclosure. For example, the workload protection logic may be implemented across a variety of the systems described herein such that some detections are generated on a first system type (e.g., remotely), while additional detection steps or protection actions are generated or determined in a second system type (e.g., locally). The elements depicted in FIG. 1 may also be interchangeable with other elements of FIGS. 1-2, and 4-9 as required to realize a particularly desired embodiment.

Figure 2:
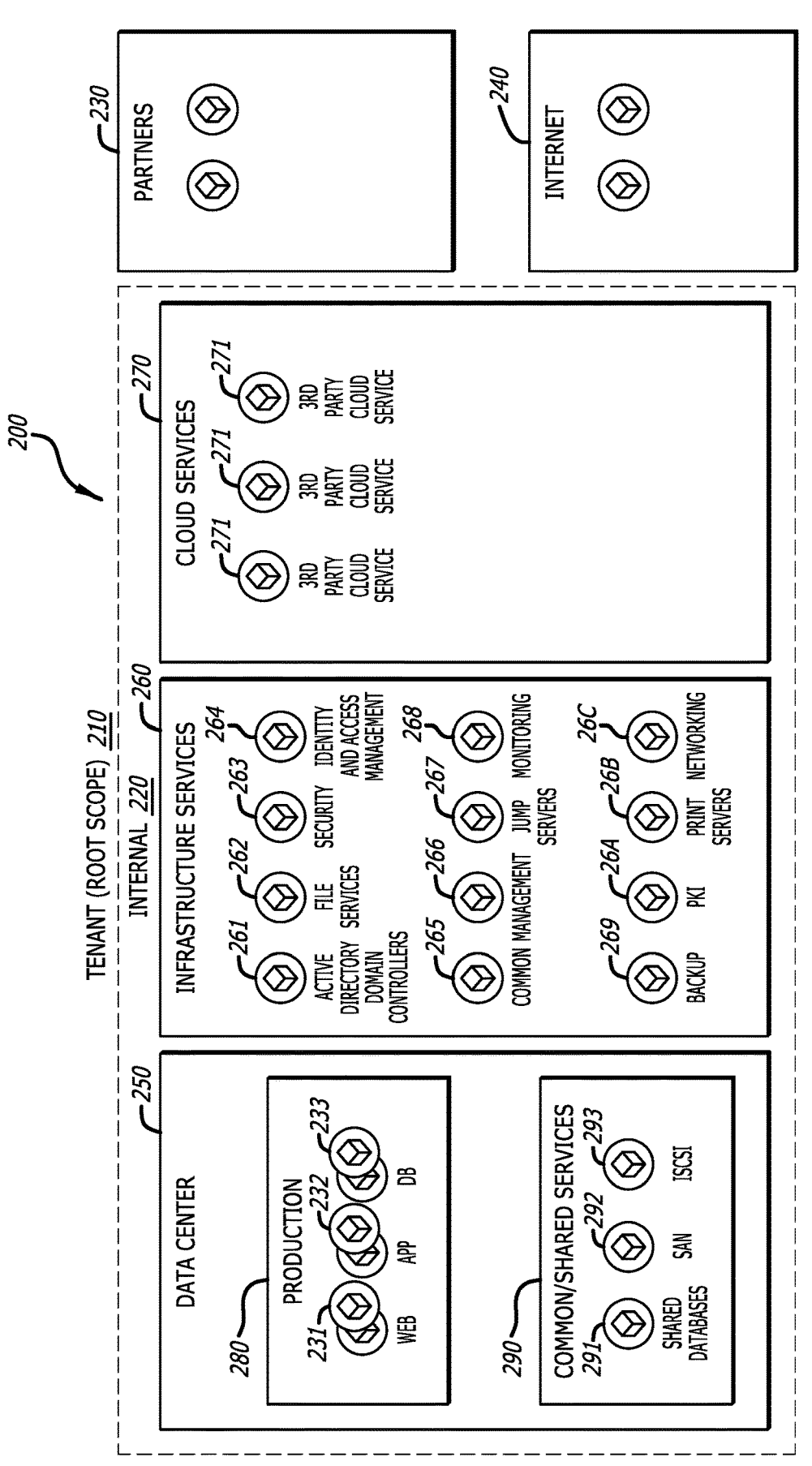
FIG. 2 is a conceptual illustration of a segmentation model within a workload protection system in accordance with various embodiments of the disclosure.

Referring to FIG. 2, a conceptual illustration of a segmentation model within a workload protection system in accordance with various embodiments of the disclosure is shown. As discussed above, segmentation can be utilized as a strategic dividing of a network into smaller, isolated segments or sub-networks. This segmentation can be applied to networks of various sizes and configurations. The embodiment depicted in FIG. 2 is a network 200 that is segmented into various segments.

In many embodiments, the network 200 can have a tenant or root scope 210 that encompasses all other segments. Within the root scope 210, an internal scope 220 and various external scopes can be segmented. In the embodiment depicted in FIG. 2, the external scopes include a partner segment 230 and an Internet segment 240. As discussed in more detail below, the external scopes and/or segments can include various services and databases.

In a number of embodiments, the internal scope 220 can include a number of segments. In the embodiment depicted in FIG. 2, the internal scope 220 includes a data center segment 250, an infrastructure services segment 260, and a cloud services segment 270. The data center segment 250 can itself comprise a production segment 280 and a common/shared services segment 290.

In some embodiments, the infrastructure services can include a plurality of segments. The embodiment depicted in FIG. 2 includes various segments such as an active directory domain controller segment 261, a file services segment 262, a security segment 263, an identity and access management segment 264, a common segment 265, a management segment 266, a jump services segment 267, a monitoring segment 268, a backup segment 269, a PKI segment 26A, a print servers segment 26B, and a networking segment 26C. As those skilled in the art will recognize, the number, amount, variety, and size of the segments in a scope can vary depending on the application desired.

Similarly, in various embodiments, the cloud services segment 270 can include a plurality of various third-party cloud services 271. Those skilled in the art will recognize that different cloud-based services can be incorporated based on the specific need. Likewise, additional embodiments may include a production segment 280 comprising a web segment 281, an app segment 282, and a database segment 283 (shown as "DB"). In still more embodiments, a common/shared services segment 290 may comprise a shared databases segment 291, a SAN segment 292, and an ISCSI segment 293. Each of these segments can provide an additional layer of security and overall workload protection within a network.

Although a specific embodiment for a conceptual illustration of a segmentation model within a workload protection system suitable for carrying out the various steps, processes, methods, and operations described herein is discussed with respect to FIG. 2, any of a variety of systems and/or processes may be utilized in accordance with embodiments of the disclosure. For example, the segmentation can comprise more or fewer scopes as needed based on the desired application and each various devices associated with a particular segment may be redeployed to a new scope as needed. The scopes may be dynamically assigned. The elements depicted in FIG. 2 may also be interchangeable with other elements of FIGS. 1 and 3-9 as required to realize a particularly desired embodiment.

Figure 3:
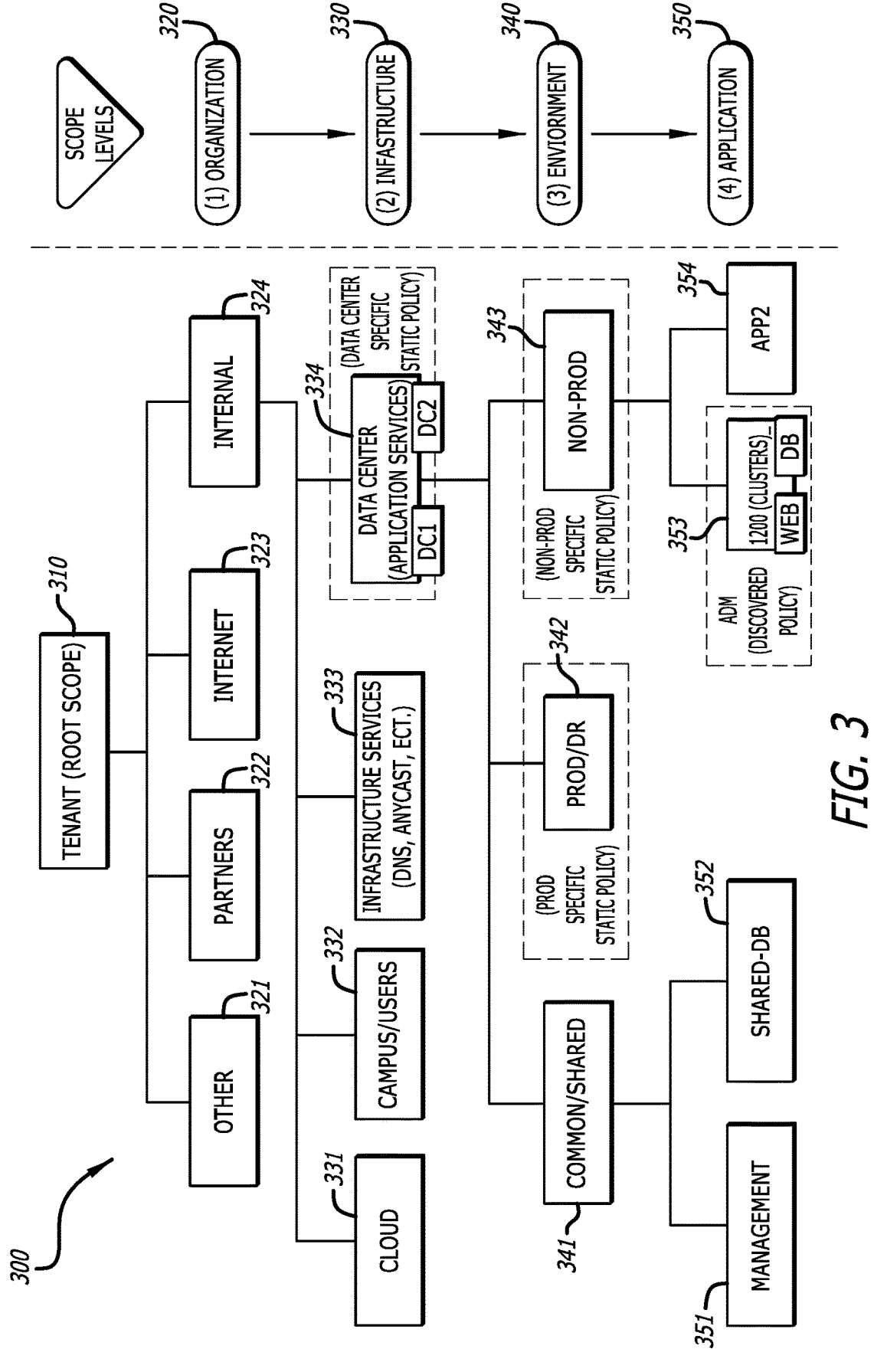
FIG. 3 is a conceptual hierarchal scope design within a workload protection system in accordance with various embodiments of the disclosure.

Referring to FIG. 3, a conceptual hierarchal scope design 300 within a workload protection system in accordance with various embodiments of the disclosure is shown. As discussed above, scopes can be configured as a collection of workloads that are organized in a hierarchal fashion. The embodiment depicted in FIG. 3 is a hierarchal scope design 300 that has an organization scope level 320, an infrastructure scope level 330, an environment scope level 340, and an application scope level 350. Each of these scope levels can be associated with a plurality of segments, applications, workloads, etc. Typically, however, each scope is nested within a tenant or root scope 310.

In the organization scope level 320, the embodiment depicted in FIG. 3 comprises an "other" segment 321, a partners segment 322, an Internet segment 323, and an internal segment 324. Each of these segments 321-324 is a child of the root scope 310. In some embodiments, the internal segment 324 can comprise a plurality of children segments that are associated with a different scope level. In the embodiment depicted in FIG. 3, the internal segment 324 has multiple children segments 331-334 that are associated with the infrastructure scope level 330. These children segments include a cloud segment 331 which can be associated with a plurality of third-party cloud-based services, a campus/users segment 332, an infrastructure services segment 323 (which is shown as including services such as, but not limited to, dynamic naming service, Anycast, and the like). The infrastructure scope level 330 may also include a data center segment 334 that can have a specific scope policy that is associated with one or more data centers such as a first data center (shown as "DC1") and a second data center (shown as "DC2") in the embodiment depicted in FIG. 3.

In further embodiments, an environment scope level 340 can be associated with a plurality of segments. In the embodiment depicted in FIG. 3, a common/shared segment 341, a production/DR segment 342, and a non-production segment 343 (shown as "Non-Prod") is associated with the environment scope level 340. Both the production/DR segment 342, and the non-production segment 343 can have a specific statis policy associated with each of them. Each of these segments 341-343 is depicted as being a child parent of the data center segment 334.

In more embodiments, the application scope level 350 can be associated with segments that are children of segments within the environment scope level 340. In the embodiment depicted in FIG. 3, the common/shared segment 341 has two children segments as a management segment 351 and a shared database segment 352 (shown as "Shared-DB"). Likewise, the nonproduction segment 343 can have two children segments in a cluster segment 353 (shown as "1200 (clusters) . . . ), and a second application scope 354 (shown as "APP2"). Furthermore, within the cluster segment 353, specific web or database services (shown as "DB") can be associated with the segment that has an application dependency map applied as a discovered policy (shown as "ADM"). This hierarchal nature can aid a network or system administrator to visualize and understand relationships between various segments, allowing for more efficient application of network policies, providing increased network security.

Although a specific embodiment for a conceptual hierarchal scope design within a workload protection system suitable for carrying out the various steps, processes, methods, and operations described herein is discussed with respect to FIG. 3, any of a variety of systems and/or processes may be utilized in accordance with embodiments of the disclosure. For example, scope may vary depending on the size of the network or the application desired. Additionally, the scope may change based on one or more events or user input. The elements depicted in FIG. 3 may also be interchangeable with other elements of FIGS. 1-2 and 4-9 as required to realize a particularly desired embodiment.

Figure 4:
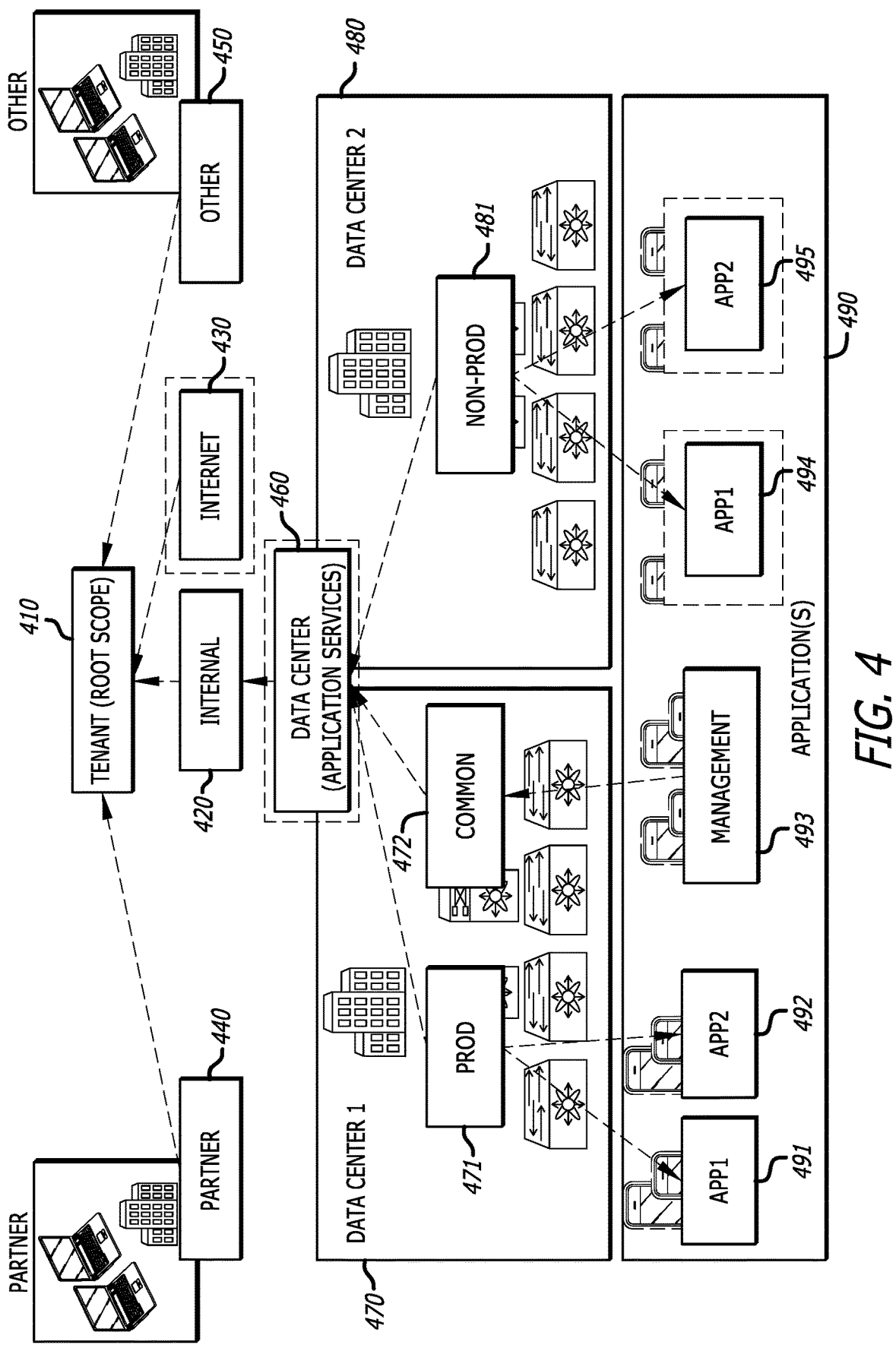
FIG. 4 is a conceptual illustration of a network topology operating with a workload protection system in accordance with various embodiments of the disclosure.

Referring to FIG. 4, a conceptual illustration of a network topology 400 operating with a workload protection system in accordance with various embodiments of the disclosure is shown. In many embodiments, the network topology 400 can include a tenant or root scope 410 which is connected to both a partner segment 440 and other segment 450 which can be external network segments. Conversely, the topology 400 can include an internal segment 420 and an Internet segment 430 that are also connected to the root scope 410.

In various embodiments, a data center segment 460 can include a plurality of data center segments. In the embodiment depicted in FIG. 4, there is a first data center segment 470 (shown as "data center 1") and a second data center segment 480 (shown as "data center 2"). The first data center segment 470 can include a production segment 471 (shown as "PROD") and a common segment 472. Each of these segments are children of the data center segment 460. Similarly, the second data center segment 480 can include a non-production segment 481 (shown as "Non-PROD"), which is also a child of the parent data center segment 460. As those skilled in the art will recognize, the number of segments and/or data centers that can be including within a topology 400 can vary based on the desired application or deployment.

In more embodiments, the topology 400 can include an application segment 490 that can include various sub-segments. In the embodiment depicted in FIG. 4, the application segment 490 includes a first application segment 491 (shown as "APP1") and a second application segment 492 (shown as "APP2") as well as a management segment 493. Each of these segments 491-493 are children of the first data center segment 470. Specifically, the first application segment 491 and second application segment 492 are children of the parent production segment 471, while the management segment 493 is a child of the parent common segment 472. Similarly, an additional series of non-production applications can be within the application segment 490. In the embodiment depicted in FIG. 4, a third application 494 (shown as "APP3") and a fourth application 495 (shown as "APP4").

Each of these segments, as shown in the topology 400 can allow for unique policy applications that can keep the overall network more secure. As those skilled in the art will recognize, the embodiments depicted in FIGS. 2-4 are all various ways to organize, visualize, or otherwise establish a segmentation strategy for a network. Each method of laying out a segmentation strategy can provide different views or aspects that can help address any issues or remaining portions of the network that still require segmentation or securing.

Although a specific embodiment for a conceptual illustration of a network topology operating with a workload protection system suitable for carrying out the various steps, processes, methods, and operations described herein is discussed with respect to FIG. 4, any of a variety of systems and/or processes may be utilized in accordance with embodiments of the disclosure. For example, specific layout of the topology 400 can vary greatly depending on the specific network being protected. The elements depicted in FIG. 4 may also be interchangeable with other elements of FIGS. 1-3 and 5-9 as required to realize a particularly desired embodiment.

Figure 5:
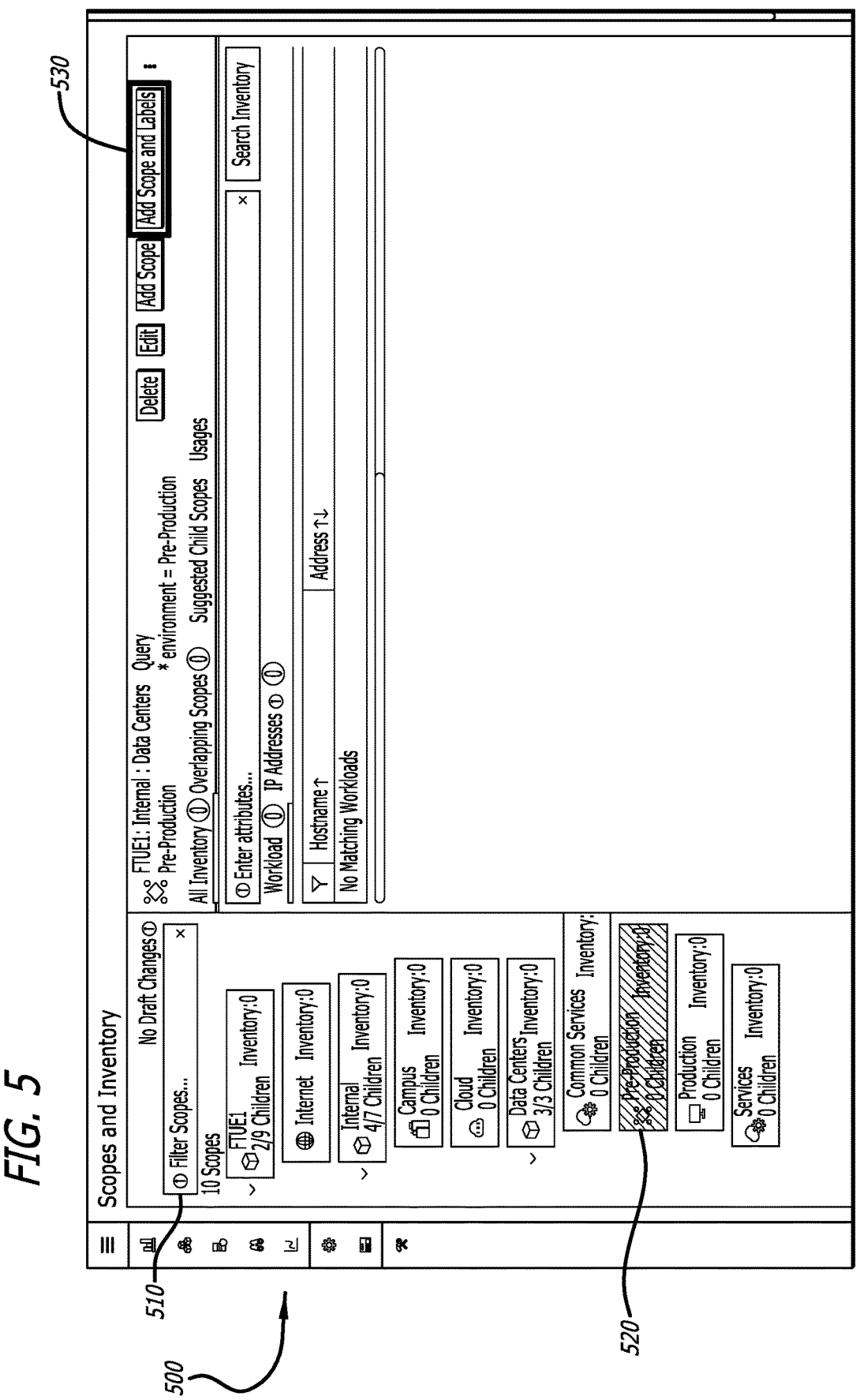
FIG. 5 is a graphical user interface for application onboarding in accordance with various embodiments of the disclosure.

Referring to FIG. 5, a graphical user interface 500 for application onboarding in accordance with various embodiments of the disclosure is shown. In the embodiment depicted in FIG. 5, the graphical user interface 500 can include a scope definition window 510, which can allow a user or network administrator to select the proper scope to apply to the application being onboarded. As shown in FIG. 5, the scope definition window 510 can include various available scopes, provide a filter to narrow down the scopes shown, and provide other relevant information such as the number of children, the name of the scope, and the current inventory.

In the embodiment depicted in FIG. 5, the user has made indicated a selected scope 520 (shown as "Pre-Production"). In this exemplary embodiment, the onboarded application is desired to be associated with the pre-production label and, if previously present, can inherit all previously defined traits, attributes, and/or characteristics associated with that scope. This selected scope 520 may also indicate what policy may be suitable for the application.

Additionally in the embodiment depicted in FIG. 5, the graphical user interface 500 provides an 'add scope and label' button 530 which can be selected by a user to add new scopes and/or labels that may not already be in the system. In this way, the graphical user interface 500 can prompt the user to enter in additional information about the onboarded application and create a new label or scope, which can subsequently be added to the system.

Although a specific embodiment for a graphical user interface for application onboarding suitable for carrying out the various steps, processes, methods, and operations described herein is discussed with respect to FIG. 5, any of a variety of systems and/or processes may be utilized in accordance with embodiments of the disclosure. For example, those skilled in the art will recognize that a graphical user interface 500 can be adjusted, changed, or otherwise modified as needed depending on the host device and/or the application desired. The embodiment depicted in FIG. 5 is presented for conceptual purposes and is not meant to be limiting to the specific format of presentation or layout. The elements depicted in FIG. 5 may also be interchangeable with other elements of FIGS. 1-4 and 6-9 as required to realize a particularly desired embodiment.

Figure 6:
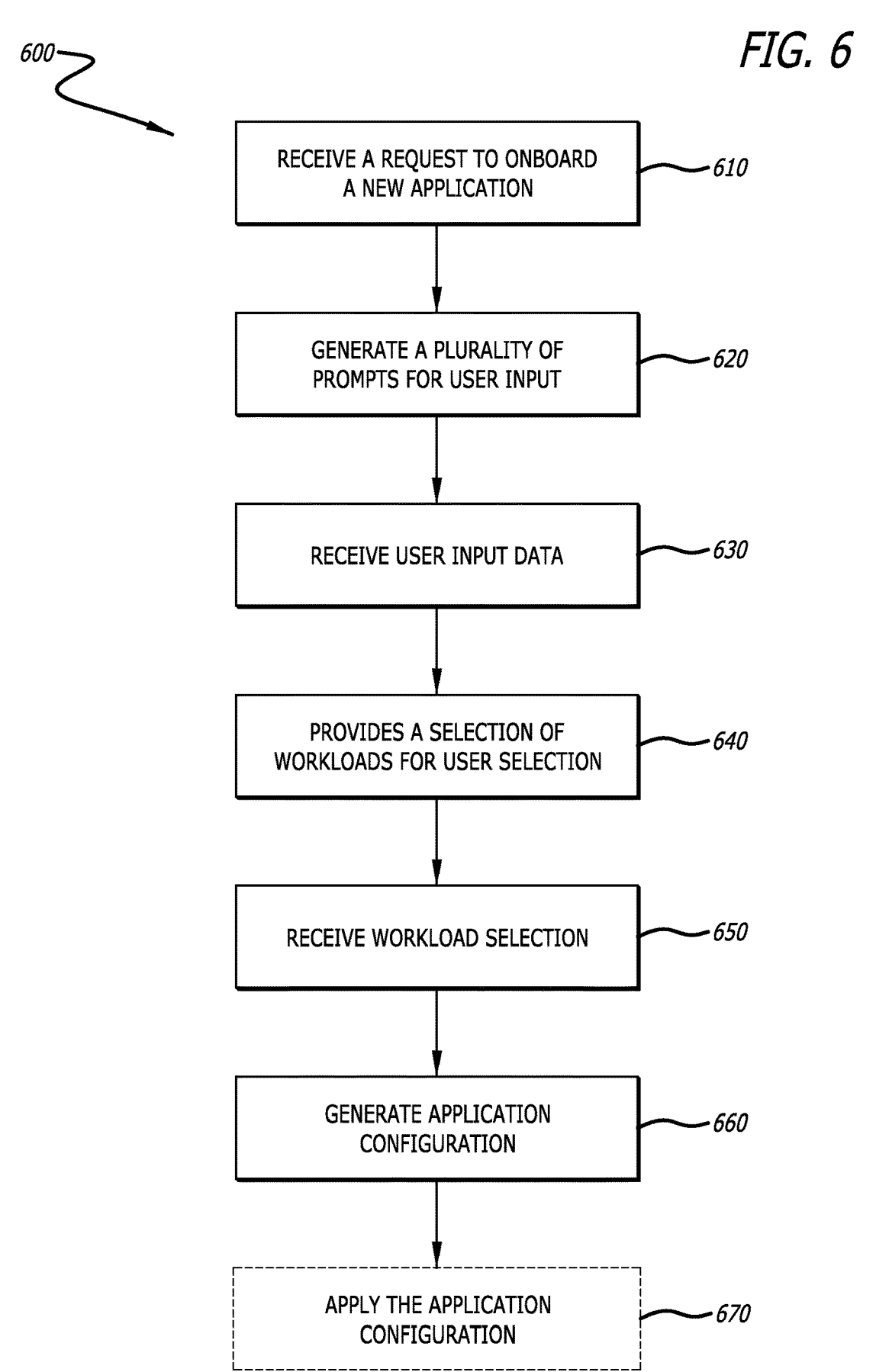
FIG. 6 is a flowchart depicting a process for application onboarding in workload protection solutions in accordance with various embodiments of the disclosure.

Referring to FIG. 6, a flowchart depicting a process 600 for application onboarding in workload protection solutions in accordance with various embodiments of the disclosure is shown. In many embodiments, the process 600 can receive a request to onboard a new application (block 610). These requests can be manually triggered by a user. However, in some embodiments, the request can be generated as a result of detecting the presence of a new application within the network ecosystem.

In a number of embodiments, the process 600 can generate a plurality of prompts for user input (block 620). These prompts may be generated to be displayed on a graphical user interface, such as the interface depicted in the embodiment of FIG. 5. In certain embodiments, the prompts can be configured to elicit responses relating to the new application.

In more embodiments, the process 600 can receive user input data (block 630). Often, this user input data is received in response to completing one or more generated prompts. However, user input data may be data that has been previously entered and has been stored for future use (e.g., systems data, user preferences, etc.). As described in more detail below, the user input data may be related to scope, labels, and/or application names for the new application within the workload protection solution system.

In various embodiments, the process 600 can provide a selection of workloads for user selection (block 640). As those skilled in the art will recognize, the process 600 can accept new workloads associated with the new application. Those workloads can be provided for selection to a user. However, certain embodiments may provide for one or more automatic selections of workloads. This automatic selection can be determined from a predetermined threshold, heuristic rule set, and/or one or more machine learning processes.

In further embodiments, the process 600 can receive a workload selection (block 650). Similar to the user input data, the workload selection may be received in response to a user interacting with one or more generated prompts configured to workload selection. However, workload selection data may be data that has been previously entered and has been stored for future use (e.g., systems data, user preferences, etc.).

In additional embodiments, the process 600 can generate an application configuration (block 660). The application configuration can be configured to accommodate the new application based at least in part on the received user input data and/or workload selection data. As discussed below, the application configuration can be generated based on a heuristic rule set, or may be determined by one or more machine learning processes. In certain embodiments, the process 600 may determine if a new workspace is needed for the application as part of the evaluation.

In still more optional embodiments, the process 600 can apply the application configuration (block 670). The application of the configuration can be done within a workload protection solution. However, one or more settings within the application, or in an instance or deployment of the application, may also be edited based in part from the generated application configuration.

Although a specific embodiment for a process 600 for application onboarding in workload protection solutions suitable for carrying out the various steps, processes, methods, and operations described herein is discussed with respect to FIG. 6, any of a variety of systems and/or processes may be utilized in accordance with embodiments of the disclosure. For example, the application configuration can be generated by the workload protection logic, but may, in certain embodiments, be generated by a cloud-based service and delivered for application to the network. The elements depicted in FIG. 6 may also be interchangeable with other elements of FIGS. 1-5 and 7-9 as required to realize a particularly desired embodiment.

Referring to FIG. 7, a flowchart depicting a more-detailed process 700 for application onboarding in workload protection solutions in accordance with various embodiments of the disclosure is shown. In many embodiments, the process 700 can define at least one scope (block 710). As those skilled in the art will recognize, the scope can define the boundary of the application. The scope name may also be a typical representation of the application that is defined by its membership.

In a number of embodiments, the process 700 can determine an application name (block 720). In various embodiments, the application name can be representative of the application. A user, such as a network administrator, may manually select an application name. However, in certain embodiments, the process 700 may utilize various data points to generate a suggested application name.

In more embodiments, the process 700 can add one or more workloads (block 730). Often, these added workloads are associated with the new application. Additionally, some applications may be associated with several different workloads. Thus, the various workloads (such as those associated with the new application) can be presented to the user, such as within a graphical user interface similar to the one depicted in the embodiment of FIG. 5.

In further embodiments, the process 700 can select a plurality of workloads (block 740). The selection of the workloads may be done via a presentation to and receiving input from a user, such as through a graphical user interface or the like. However, in certain embodiments, the process 700 may utilize one or more machine learning processes to select the plurality of workloads. By the nature of a hierarchal design, workloads or members of the parent scope, in various embodiments, can be selected for membership in the child scope/application.

In more embodiments, the process 700 can generate an application configuration (block 750). The application configuration can be generated at least from the previous workload selection, determined application name, and/or defined scope. In additional embodiments, the process 700 can verify the application configuration (block 760). This verification can be a prompt to the user prior to continuing the process. In some embodiments, the verification can be done to check if all prior data utilized is valid and does not conflict with one or more rules or limitations.

In several embodiments, the process 700 can determine if an initial workspace is required (block 765). As those skilled in the art will recognize, while completing creation of the scope and application, it can be known if a corresponding workspace should be created for policy evaluation. In response to no workspace being required, the process 700 can apply the application configuration (block 790).

However, when an initial workspace is required, the process 700 can create a corresponding workspace (block 770). In more embodiments, the process 700 can evaluate workspace policies (block 780). This can be done to verify the workspace created in conjunction with the corresponding policies.

In various embodiments, the process 700 can apply the application configuration (block 790). The application of the configuration can be done within a workload protection solution. However, one or more settings within the application, or in an instance or deployment of the application, may also be edited based in part from the generated application configuration.

Although a specific embodiment for a more-detailed process 700 for application onboarding in workload protection solutions suitable for carrying out the various steps, processes, methods, and operations described herein is discussed with respect to FIG. 7, any of a variety of systems and/or processes may be utilized in accordance with embodiments of the disclosure. For example, it is contemplated that based on the specific application being onboarded, one or more steps or operations within the process 700 may be skipped or not presented. The elements depicted in FIG. 7 may also be interchangeable with other elements of FIGS. 1-6 and 8-9 as required to realize a particularly desired embodiment.

Figure 8:
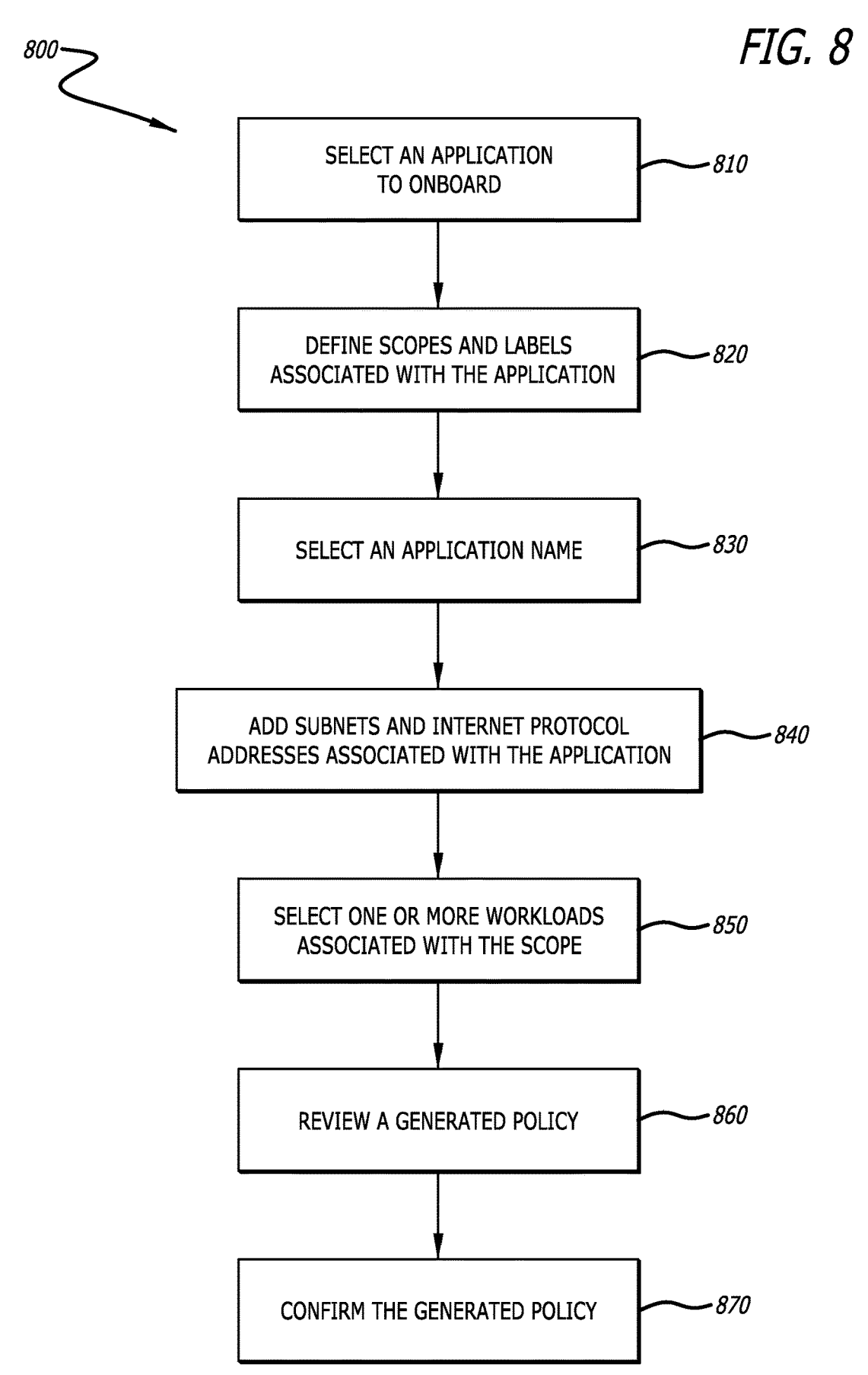
FIG. 8 is flowchart depicting an additional process for application onboarding in workload protection solutions in accordance with various embodiments of the disclosure.

Referring to FIG. 8, a flowchart depicting an additional process 800 for application onboarding in workload protection solutions in accordance with various embodiments of the disclosure is shown. In many embodiments, the process 800 can select an application to onboard (block 810). This selection can be made in response to user input, such as a selection made from a graphical user interface or the like. In certain embodiments, the selection can be made by detecting the presence of a new application within the network or in a specialized data store indicating that a new application is present.

In a number of embodiments, the process 800 can define scopes and labels associated with the application (block 820). Again, the selection can be received as user input data from one or more prompts generated to a user or network administrator of the workload protection solution. However, in some embodiments, the definition can be automatically generated at least in part, such as generating recommendations that are presented to the user.

In more embodiments, the process 800 can select an application name (block 830). In various embodiments, the application name can be representative of the application. A user, such as a network administrator, may manually select an application name. However, in certain embodiments, the process 800 may utilize various data points to generate a suggested application name.

In additional embodiments, the process 800 can add subnets and internet protocol (IP) addresses associated with the application (block 840). As those skilled in the art will recognize, subnets can define the membership of an application by the defined bit boundary. Likewise, hosts can be defined by the individual IP addresses of the workload(s).

In several embodiments, the process 800 can select one or more workloads associated with the scope (block 850). The selection of the workloads may be done via a presentation to and receiving input from a user, such as through a graphical user interface or the like. However, in certain embodiments, the process 800 may utilize one or more machine learning processes to select the plurality of workloads. By the nature of a hierarchal design, workloads, or members of the parent scope, in various embodiments, can be selected for membership in the child scope/application.

In further embodiments, the process 800 can review a generated policy (block 860). As described above, a policy can be generated by various embodiment described herein. The generated policy can be presented to the user for review, such as in a graphical user interface. However, in some embodiments, the review can be done by a set of heuristic rule sets, such as to verify the policy complies with various rules or limitations imposed on any generated policies, etc.

In still more embodiments, the process 800 can confirm the generated policy (block 870). This confirmation can be a prompt to the user prior to continuing the process. In some embodiments, the confirmation can be done to check if all prior data utilized is valid and does not conflict with one or more rules or limitations.

Although a specific embodiment for an additional process 800 for application onboarding in workload protection solutions suitable for carrying out the various steps, processes, methods, and operations described herein is discussed with respect to FIG. 8, any of a variety of systems and/or processes may be utilized in accordance with embodiments of the disclosure. For example, elements of the process 800 can be require user input at one or more, or none of the steps described herein. The elements depicted in FIG. 8 may also be interchangeable with other elements of FIGS. 1-7 and 9 as required to realize a particularly desired embodiment.

Figure 9:
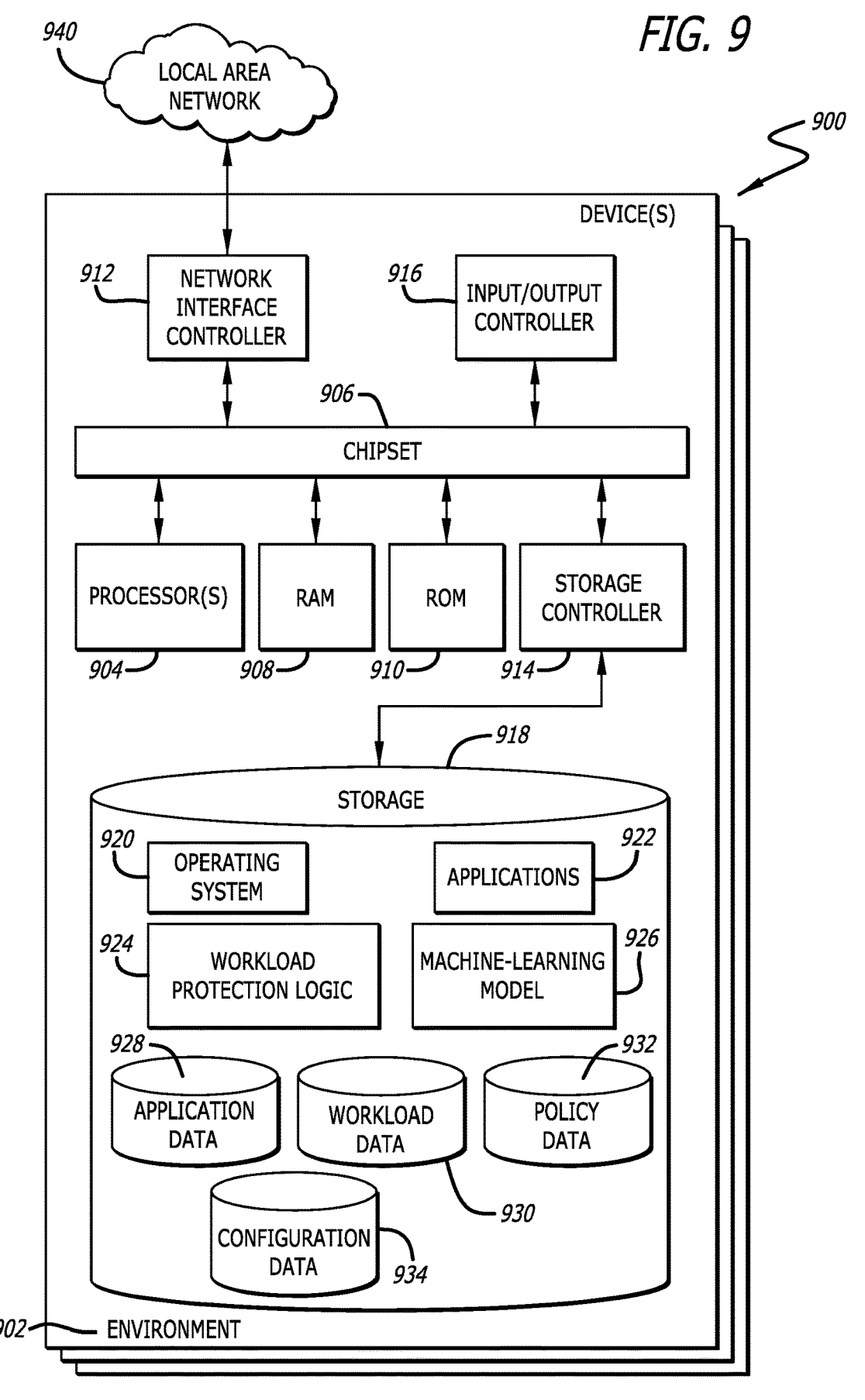
FIG. 9 is a conceptual block diagram of a device suitable for configuration with a workload protection logic in accordance with various embodiments of the disclosure.

Referring to FIG. 9, a conceptual block diagram of a device 900 suitable for configuration with a workload protection logic 924 in accordance with various embodiments of the disclosure is shown. The embodiment of the conceptual block diagram depicted in FIG. 9 can illustrate a conventional server computer, workstation, desktop computer, laptop, tablet, network device, access point, router, switch, e-reader, smart phone, centralized management service, or other computing device, and can be utilized to execute any of the application and/or logic components presented herein. The device 900 may, in some examples, correspond to physical devices and/or to virtual resources and embodiments described herein.

In many embodiments, the device 900 may include an environment 902 such as a baseboard or "motherboard," in physical embodiments that can be configured as a printed circuit board with a multitude of components or devices connected by way of a system bus or other electrical communication paths. Conceptually, in virtualized embodiments, the environment 902 may be a virtual environment that encompasses and executes the remaining components and resources of the device 900. In more embodiments, one or more processors 904, such as, but not limited to, central processing units ("CPUs") can be configured to operate in conjunction with a chipset 906. The processor(s) 904 can be standard programmable CPUs that perform arithmetic and logical operations necessary for the operation of the device 900.

In additional embodiments, the processor(s) 904 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 906 may provide an interface between the processor(s) 904 and the remainder of the components and devices within the environment 902. The chipset 906 can provide an interface to communicatively couple a random-access memory ("RAM") 908, which can be used as the main memory in the device 900 in some embodiments. The chipset 906 can further be configured to provide an interface to a computer-readable storage medium such as a read-only memory ("ROM") 910 or non-volatile RAM ("NVRAM") for storing basic routines that can help with various tasks such as, but not limited to, starting up the device 900 and/or transferring information between the various components and devices. The ROM 910 or NVRAM can also store other application components necessary for the operation of the device 900 in accordance with various embodiments described herein.

Different embodiments of the device 900 can be configured to operate in a networked environment using logical connections to remote computing devices and computer systems through a network, such as the network 940. The chipset 906 can include functionality for providing network connectivity through a network interface card ("NIC") 912, which may comprise a gigabit Ethernet adapter or similar component. The NIC 912 can be capable of connecting the device 900 to other devices over the network 940. It is contemplated that multiple NICs 912 may be present in the device 900, connecting the device to other types of networks and remote systems.

In further embodiments, the device 900 can be connected to a storage 918 that provides non-volatile storage for data accessible by the device 900. The storage 918 can, for example, store an operating system 920, applications 922, and data 928, 930, 932, which are described in greater detail below. The storage 918 can be connected to the environment 902 through a storage controller 914 connected to the chipset 906. In certain embodiments, the storage 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 900 can store data within the storage 918 by transforming the physical state of the physical storage units to reflect the information being stored. The specific transformation of physical state can depend on various factors. Examples of such factors can include, but are not limited to, the technology used to implement the physical storage units, whether the storage 918 is characterized as primary or secondary storage, and the like.

For example, the device 900 can store information within the storage 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 900 can further read or access information from the storage 918 by detecting the physical states or characteristics of one or more particular locations within the physical storage units.

In addition to the storage 918 described above, the device 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 900. In some examples, the operations performed by a cloud computing network, and or any components included therein, may be supported by one or more devices similar to device 900. Stated otherwise, some or all of the operations performed by the cloud computing network, and or any components included therein, may be performed by one or more devices 900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 918 can store an operating system 920 utilized to control the operation of the device 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 918 can store other system or application programs and data utilized by the device 900.

In various embodiment, the storage 918 or other computer-readable storage media is encoded with computer-executable instructions which, when loaded into the device 900, may transform it from a general-purpose computing system into a special-purpose computer capable of implementing the embodiments described herein. These computer-executable instructions may be stored as application 922 and transform the device 900 by specifying how the processor(s) 904 can transition between states, as described above. In some embodiments, the device 900 has access to computer-readable storage media storing computer-executable instructions which, when executed by the device 900, perform the various processes described above with regard to FIGS. 1-9. In more embodiments, the device 900 can also include computer-readable storage media having instructions stored thereupon for performing any of the other computer-implemented operations described herein.

In still further embodiments, the device 900 can also include one or more input/output controllers 916 for receiving and processing input from a number of input devices, such as a keyboard, a mouse, a touchpad, a touch screen, an electronic stylus, or other type of input device. Similarly, an input/output controller 916 can be configured to provide output to a display, such as a computer monitor, a flat panel display, a digital projector, a printer, or other type of output device. Those skilled in the art will recognize that the device 900 might not include all of the components shown in FIG. 9 and can include other components that are not explicitly shown in FIG. 9 or might utilize an architecture completely different than that shown in FIG. 9.

As described above, the device 900 may support a virtualization layer, such as one or more virtual resources executing on the device 900. In some examples, the virtualization layer may be supported by a hypervisor that provides one or more virtual machines running on the device 900 to perform functions described herein. The virtualization layer may generally support a virtual resource that performs at least a portion of the techniques described herein.

In many embodiments, the device 900 can include a workload protection logic 924 that can be configured to perform one or more of the various steps, processes, operations, and/or other methods that are described above. While the embodiment shown in FIG. 9 depicts a logic focused on workload protection, it is contemplated that a more general "cybersecurity" logic may be utilized as well or in lieu of such logic. Often, the workload protection logic 924 can be a set of instructions stored within a non-volatile memory that, when executed by the controller(s)/processor(s) 904, can carry out these steps, etc. In some embodiments, the workload protection logic 924 may be a client application that resides on a network-connected device, such as, but not limited to, a server, switch, personal or mobile computing device in a single or distributed arrangement. In certain embodiments, the workload protection logic 924 can be a dedicated hardware device, cloud-based service, or be configured into a system on a chip package (FPGA, ASIC and the like).

In a number of embodiments, the storage 918 can include application data 928. As discussed above, the application data 928 can be collected in a variety of ways and may involve data related to multiple network devices. The application data 928 may be associated with an entire application or a portion/partition of an application. This may also include a relationship of the various associated devices that are in communication with each other when executing the application. In additional embodiments, the application data 928 can include data or telemetry related to the configuration of one or more network devices, data centers, applications, or the like, including, but not limited to, IP addresses, subnets, etc. This application data 928 can be utilized by an application onboarding process to generate prompts, suggestions, or other interactions with a user when setting up a network for workload protection. As those skilled in the art will recognize, application data 928 can be configured to track a variety of different aspects of a network, it's devices, and associated workloads.

In various embodiments, the storage 918 can include workload data 930. As described above, workload data 930 can be associated with various network devices, data centers, applications, or other processes within a network. Each workload may have additional workload data 930 associated with it including origin, status, label, scope, etc. In various embodiments, workload data 930 may be utilized to describe additional attributes of the workload, including one of: a workload's bandwidth usage, latency, traffic patterns, quality-related metrics, throughput, performance, security-related events, resource utilization, and/or scalability traits.

In still more embodiments, the storage 918 can include policy data 932. As discussed above, policy data 932 can include data that related to a network's configuration, such as hierarchy, segmentation, scope, labels, etc. In some embodiments, policy data 932 can be associated with one of: access control, quality-related policies, security, routing, traffic shaping, authentication/authorization, compliance, data retention/backup, remote access, wireless network policies, and/or any service level agreements. Policy data 932 can be utilized by the workload protection solution in various ways including, but not limited to, developing a segmentation policy, and/or generating one or more prompts during a first-time user experience.

In still more embodiments, the storage 918 can include configuration data 934. As discussed above, configuration data 934 can be data associated with an application and its deployment on the network. Configuration data 934 may also include data associated with the data received from various user inputs via application onboarding prompts or the like. The configuration data 934 can be combined or utilized in tandem with various data received from one or more agents deployed on the network. In certain embodiments, the configuration data 934 can be received via one or more web-based protocols which can be stored on a temporary basis or parsed and stored in a long-term way within the configuration data 934.

Finally, in many embodiments, data may be processed into a format usable by a machine-learning model 926 (e.g., feature vectors, etc.), and or other pre-processing techniques. The machine learning ("ML") model 926 may be any type of ML model, such as supervised models, reinforcement models, and/or unsupervised models. The ML model 926 may include one or more of linear regression models, logistic regression models, decision trees, Naïve Bayes models, neural networks, k-means cluster models, random forest models, and/or other types of ML models 926. The ML model 926 may be configured to learn the pattern of a network's current setup and/or any security needs of various network devices and generate predictions, configurations, and/or confidence levels regarding application configuration within a network for workload protection and/or segmentation, etc. In some embodiments, the ML model 926 can be configured to determine which method of generating those predictions would work best based on certain conditions or with certain network devices.

The ML model(s) 926 can be configured to generate inferences to make predictions or draw conclusions from data. An inference can be considered the output of a process of applying a model to new data. This can occur by learning from at least the application data 928, workload data 930, policy data 932, configuration data 934, and/or the underlying algorithmic data and use that learning to predict future configurations, outcomes, and needs. These predictions are based on patterns and relationships discovered within the data. To generate an inference, such as a determination on anomalous movement, the trained model can take input data and produce a prediction or a decision/determination. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 926 may be generated by human/administrator verifications or may compare predicted outcomes with actual outcomes. The training set of the ML model(s) 926 can be provided by the manufacturer prior to deployment and can be based on previously verified data.

Although a specific embodiment for a device 900 suitable for configuration with a workload protection logic 924 suitable for carrying out the various steps, processes, methods, and operations described herein is discussed with respect to FIG. 9, any of a variety of systems and/or processes may be utilized in accordance with embodiments of the disclosure. For example, the device may be in a virtual environment such as a cloud-based network administration suite, or it may be distributed across a variety of network devices such that each acts as a device and the workload protection logic 924 acts in tandem between the devices. The elements depicted in FIG. 9 may also be interchangeable with other elements of FIGS. 1-8 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each, and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
a processor;
at least one network interface controller configured to provide access to a network; and
a memory communicatively coupled to the processor, wherein the memory comprises a workload protection logic that is configured to:
receive an application onboarding request;
generate a plurality of prompts configured for user input;
receive user input data;
generate an application configuration;
define one or more scopes and labels associated with an application based on the user input data;
select an application name representative of the application based on the user input data or one or more data points;
add one or more subnets and internet protocol (IP) addresses associated with the application; and
select one or more workloads associated with the defined scopes based on the user input data.

2. The device of claim 1, wherein the application onboarding request is associated with a specific application.

3. The device of claim 2, wherein the plurality of prompts are generated based on at least the specific application.

4. The device of claim 1, wherein the plurality of prompts are displayed on a graphical user interface.

5. The device of claim 4, wherein the graphical user interface is associated with a workload protection solution.

6. The device of claim 1, wherein the workload protection logic is further configured to:
determine one or more workloads associated with the user input data; and
provide a selection of workloads configured for user selection.

7. The device of claim 6, wherein the selection of workloads is provided on a graphical user interface.

8. The device of claim 6, wherein the workload protection logic is further configured to receive a workload selection.

9. The device of claim 1, wherein the workload protection logic is further configured to generate an application configuration based at least on the user input data and workload selection data.

10. The device of claim 1, wherein the workload protection logic is further configured to apply the application configuration to the network.

11. The device of claim 1, wherein the user input data comprises at least a valid application name.

12. The device of claim 1, wherein the user input data comprises at least a defined scope.

13. The device of claim 12, wherein a selection of workloads provided is associated with the defined scope.

14. The device of claim 13, wherein the workload protection logic is further configured to provide one or more prompts configured for subnet boundary input.

15. The device of claim 13, wherein the workload protection logic is further configured to provide one or more prompts configured for internet protocol address input.

16. The device of claim 15, wherein the workload protection logic is further configured to determine if an initial workspace will be required.

17. The device of claim 16, wherein the initial workspace is utilized for policy evaluation.

18. A method of onboarding an application, comprising:
receiving an application onboarding request;
generating a plurality of prompts configured for user input;
receive user input data;
generating application configuration;
defining one or more scopes and labels associated with an application based on the user input data;
selecting an application name representative of the application based on the user input data or one or more data points;
adding one or more subnets and internet protocol (IP) addresses associated with the application; and
selecting one or more workloads associated with the defined scopes based on the user input data.

19. A device, comprising:
a processor;
at least one network interface controller configured to provide access to a network; and
a memory communicatively coupled to the processor, wherein the memory comprises a workload protection logic that is configured to:
receive an application onboarding request;
receive user input data;
define a scope associated with an application based on the user input data;
select an application name representative of the application based on the user input data:
add one or more subnets associated with the application; and
select one or more workloads associated with the defined scopes based on the user input data.

* * * * *